July 23, 1963 H. HEUER 3,099,004
ARRANGEMENT FOR SERIES-TRANSMISSION OF CODED SIGNALS
Filed May 29, 1959
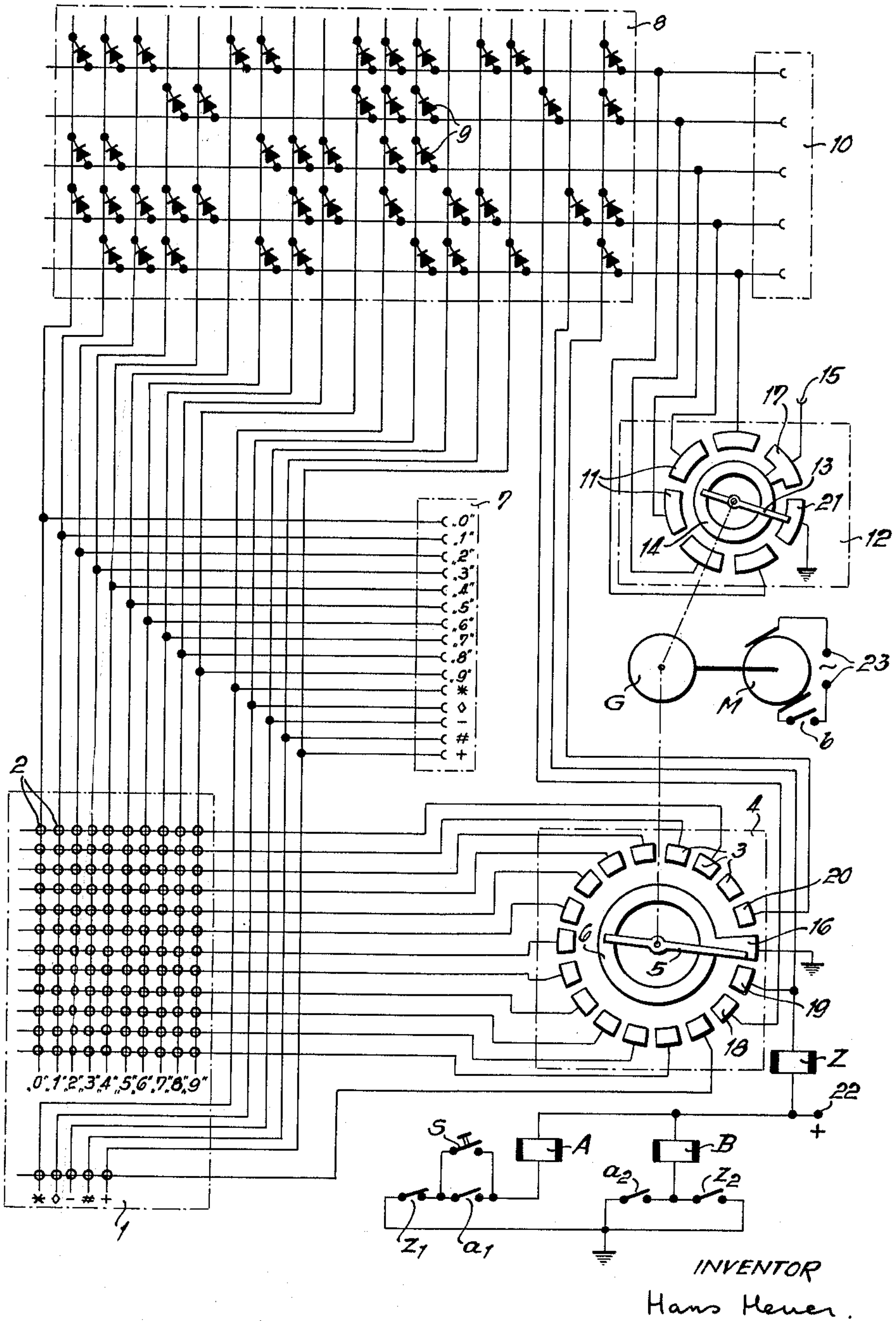
INVENTOR
Hans Heuer.
BY Michael S. Striker
Attorney United States Patent Office 3,099,004
Patented July 23, 1963

3,099,004

ARRANGEMENT FOR SERIES-TRANSMISSION OF CODED SIGNALS

Hans Heuer, Wilhelmshaven, Germany, assignor to Olympia Werke AG, Wilhelmshaven, Germany Filed May 29, 1959, Ser. No. 816,871
Claims priority, application Germany Oct. 23, 1958
11 Claims. (Cl. 340—347)

The present invention concerns arrangements applicable to calculating and similar machines and serving for transmitting messages or information, particularly derived from a storage device, in the form of electrical signals in different codes, and more specifically the invention concerns an arrangement for converting the parallel transmission of a group of code-digit signals representing a message in a chosen multi-digit code into series transmission of such groups of code-digit signals.

In modern business operations it is frequently desirable to make certain data resulting from the operation of calculating machines available in various forms of representation or recording, for instance to make the results of the calculating machine visible on a signaling panel, or to record them on a punched tape or again to record them on a magnetizable tape or even to transmit them into a teletyping network. However, the different systems for making the above mentioned results available call for a different type of code systems.

It is, therefore, a main object of this invention to provide for an arrangement capable of transmitting information that may have been obtained from the operation of a calculating machine, or may have been introduced into such a machine, and may have been stored simultaneously in the form of electrical signals representing that message or information in different types of codes.

For instance, when stored information is to be transmitted into a teletyping network, then it becomes necessary to convert a message that is delivered by a coding translator in the form of parallel code-digit impulses e.g., in a 5-digit or a pentad code, into groups of serial impulses representing the same message in the same code. It is therefore another object of this invention to provide for a converter arrangement adapted to cooperate with a system which generates the coded signals.

In known apparatus for the conversion of messages from a parallel to a series system of coding the particular messages are derived from the storage device and are first translated by a coding translator device into groups of parallel impulses whereafter these parallel impulses are again stored in this form. It is then necessary to hold the coded parallel impulse groups in this form in a second storage device until the various storage elements of that storage means are consecutively read-out or scanned for instance by means of a sequential counting chain whereby a train of series impulses representing the original message in coded form is obtained. However, arrangements of this nature are encumbered by severe disadvantages. First of all, it is necessary to provide a second storage device and second, a special counting or read-out device must be provided for translating the messages stored in the second storage device from their coded parallel form into a coded series form. In addition, synchronizing means are required which have to synchronize the delivery of signals from the first storage means with the translating operation. The second storage operation causes undesirable delays in the execution of the delivery of signals in coded form from the first storage means. Finally, the whole arrangement becomes extremely complicated and involved requiring a great number of switching and control means because a great number of control operations are required in such a system.

It is therefore a main object of the present invention to provide for an arrangement for the series-transmission of a group of electrical code-digit signals representing a message in terms of a multi-order code, avoiding all the disadvantages of the known systems.

It is a further object of this invention to provide for an arrangement of the type set forth which is comparatively very simple and requires a minimum of control means.

With above objects in view, an arrangement of the type mentioned, comprises according to the invention, in combination, an electrical translator arrangement having a plurality of first output means respectively corresponding to the orders of said code, and translator means for translating a message fed as an impulse into said translator arrangement, into signals representing code-digits in terms of said code and for feeding said code-digit signals to said corresponding first output means as a group in parallel; converter means cooperating with said plurality of first output means for converting said group of parallelly fed code-rigit signals into a sequence of said code-digit signals during the duration of each of said impulses feeding a message into said translator arrangement; and second output means connected to said converter means for transmitting said sequence of code-digit signals as a series representing said message in terms of said code.

It will be seen that an arrangement according to the invention eliminates first of all the need of a second storage device, and in simple cases it can be operated even without any storage device. The operational connection between the means generating the signals representing a particular message, with the means for converting parallel signals into series signals automatically establishes the required synchronization so that separate special synchronizing means are not necessary. On account of these features the series type signals are delivered substantially simultaneously with the generation of parallel type signals. The whole arrangement is so much simplified that it requires comparatively small space and can be controlled by the simplest means. The total number of components and control elements is very small.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which a preferred embodiment of the invention is diagrammatically illustrated.

In this particular embodiment the main components are a selector switch means, a matrix type storage device, a translator arrangement for translating message impulses into code-digit signals delivered in parallel, and a converter switch means for converting the code-digit signals delivered by the translator arrangement in parallel form, into a train of code-digit signals representing the same message in series arrangement.

Referring now to the details of the drawing, a matrix type contact storage means 1 comprises a plurality of columns of connecting lines respectively associated with a plurality of messages to be handled. These messages may be for instance digits as for instance the digits 0, 1, 2, 3, . . . 8, 9 as indicated in the drawing. The horizontal rows of connections are respectively associated with the consecutive orders of the individual messages to be handled, for instance in consecutive orders of a multi-order number. Storage means of this type are conventional and it is known that if at any one of the intersection points 2 between rows and columns thereof a contact is established, a particular message corresponding to the particular column involved, and its position in the order sequence of the whole message, corresponding to the particular horizontal row involved, is predetermined. In practice, the various columns of the device may correspond to the various number digits that may be furnished from a calculating machine, and the horizontal rows may correspond to the decimal orders of such a multi-digit number. The storage device may also contain one extra row containing contacts associated with various symbols or signs.

For releasing message impulses from the storage device 1 in proper sequential order, a selector switch means 4 is provided. This selector switch means has a plurality of stationary contacts 3 arranged along a circle, each of the contacts 3 being connected with one of the horizontal rows of the storage device 1. A rotary contact arm 5 is arranged to rotate in the direction of the arrow shown in the drawing and to engage during rotation consecutively the various stationary contacts 3. The arm 5 is permanently in conductive contact with a stationary ring contact 6 which has one extension 16 which is connected to ground. The various columns of the storage device 1 are connected with output lines from which auxiliary output lines are branched off terminating in output terminals in a terminal board 7. Therefore, whenever an impulse is delivered from any one of the columns of the storage device 1 through one of the above-mentioned output lines a direct signal is available on the terminal board 7. Such single impulse signals which are not coded may be used for operating a counting device, or signaling means for directly indicating the fact that an impulse representing a particular individual message has been issued.

The above mentioned output lines emanating from the various columns of the storage device 1 are connected with a translator arrangement 8. This translator arrangement is also of generally conventional type and is known to be capable of translating individual impulses into coded signals that are delivered in form of code-digit signals in parallel through a number of first output lines ending on the output terminal board 10 where these code-digit signals are available in parallel arrangements. The translator arrangement 8 essentially consists of a plurality of parallel output lines intersecting with the output lines coming from the storage device 1, the coding being performed by appropriately arranged diodes 9 as shown in the drawing.

The code-digit signals delivered at the terminals of the terminal board 10 as a group in parallel may be used for instance for recording the particular message expressed by such a group of coded-digit signals in a punched tape in a manner well known to the art. However for converting the parallel arrangement of the code-digit signals representing a particular message, into a corresponding series of consecutive code-digit signals, the individual output lines of the translator arrangement 8 are branched off and connected to a converter means 12.

The converter means is shown in this example of an embodiment of the invention as being a rotary switch having a rotatable contact member 13 which continuously slides with one portion thereof along a stationary inner contact ring 14 while sequentially engaging a plurality of individual stationary contacts 11, 17, 21 arranged along a circle. The five stationary contacts 11 are respectively connected with the five output lines of the translator arrangement 8. The inner contact ring 14 is connected via a stationary contact segment 17 to an output terminal 15 while the remaining stationary contact 21 is connected to ground. The output terminal 15 is designed to be connected to devices serviced by the arrangement according to the invention, for instance to a teletyping network which requires being fed with code-digit impulses in series arrangement. It will be noted that in the drawing all output terminals are assumed to have positive potential while the switches are connected to ground. Of course, this is only one possibility and the polarities might as well be reversed without changing the arrangement in any way.

It can be seen that in the illustrated embodiment the selector switch 4 is also provided with a plurality of additional stationary contacts 18, 19 and 20. These contacts are also respectively connected with the various output lines of the translator arrangement 8 and from there to the stationary contacts 11 of the converter switch 12, as well as with the output terminals of the terminal board 10. It is evident that during a rotary cycle of the selector switch 4 the contact member 5 will also consecutively engage the contacts 18 and 19 before returning to its normal position as shown in contact with the extension 16, and at the start of the operation will engage the contact 20. Consequently, upon such engagement of the contact 18, 19, 20, respectively, control impulses will be transmitted to the translator arrangement 8 where these pulses are coded and delivered as corresponding code-digit signals both to the output terminal board 10 and to the converter switch 12. These control impulses or signals may be used for actuating certain devices forming part of the apparatus which is serviced by the arrangement according to the invention, and also, such coded signals may be recorded for instance on a punched tape after being delivered to the output terminals 10. For instance, a signal generated by engagement of the contact 18 may constitute the control signal causing the return of the carriage in a teletyping machine, the impulse generated by the engagement of the contact 19 may constitute the control signal for the line-spacing, while a signal generated by the engagement of the contact 20 constitute the signal controlling the switch from letters to numerals in a teletype machine. The additional contact 19 serves also a further purpose, namely the control of the drive means operating the converter switch 12 and the selector switch 4 as will be described further below. The converter switch 12 is provided with one additional stationary contact 21 which is connected to ground and furnishes upon being engaged by the contact arm 13 a stop signal as required in the operation of a teletyping circuit, while the engagement of the contact arm 13 with the contact 17 generates the required starting signal for teletyping, which signal is actually a "no-signal" message since the connection between ground and the positive potential of the arrangement is momentarily interrupted. It will be understood however that the number of stationary contacts in either one of the two switches 4 and 12 can be chosen and their connections with other devices can be arranged in a manner required by circumstances.

In order to drive the two rotary switches 4 and 12 in a fixed time relationship, a motor M is provided and drives a transmission gear G, which, in turn, is in operative drive connection, intimated by a dash-dotted line, with the two switches 4 and 12. In the transmission G a fixed ratio between the rotary speeds of the switches 4 and 12 is established. The driven elements of the switches are the contact arm 13 and the contact member 5. According to the invention the speed ratio is such that the contact arm 13 is caused to carry out a complete revolution passing over all the stationary contacts 17, 11 and 21, while the contact member 5 of the selector switch 4 is in engagement with one of the stationary contacts 20, 3, 18 and 19, respectively.

Control means are provided for stopping and starting the drive motor M. This motor is supplied for instance with alternating current from input terminals 23 depending upon the operation of a relay contact *b*. The corresponding relay coil B is connected in a control circuit which includes a relay coil Z connected between a positive terminal 22 and the above-mentioned additional contact 19, the relay coil Z operating two relay contacts $z_1$ and $z_2$. The control circuit further comprises a relay coil A for operating two relay contacts $a_1$ and $a_2$, and a relay coil B operating the above-mentioned motor control contact *b*. Finally a main control button S is provided. The operation of this control circuit will be described further below.

*Operation*

For starting the operation of the arrangement shown in the drawing, the starter button S is closed so as to energize the relay coil A which maintains itself in energized condition through the normally closed contact $z_1$ and the now closed holding contact $a_1$. Simultaneously the normally open contact $a_2$ is closed whereby the relay coil B is energized. Hereby the motor contact $b$ is closed and the motor M is started. Consequently, both the contact arm 13 and the contact member 5 start their rotary movement. While the member 5 is passing over the contact 16 the contact arm 13 makes its first revolution which has no effect regarding the transmission of coded messages, only the above-mentioned function of the contacts 21 and 17 takes place. As the contact member 5 moves over the contact 20 a coded signal will be delivered from the translator arrangement 8 both via the terminal board 10 and via the appropriate contact 11 of the switch 12 while the contact arm 13 makes its second revolution. As the contact member 5 then proceeds to engage consecutively the various stationary contacts 3 of the switch 4, message impulses are consecutively released from the storage device 1 and fed into the translator arrangement 8 from where they are delivered in the form of code-digit signals in parallel arrangement through the terminal board 10, and at the same time are each converted during the individual revolutions of the contact arm 13 into sequences of code-digit signals in series arrangement and delivered to the output terminal 15. It is evident that the nature or type of messages handled in this manner depends upon which contacts 2 in the storage device 1 have been caused to be in conductive condition by storing a message, for instance numbers or signs, when the particular messages have been stored. It can be seen also that simultaneously with the release of any message impulse from the storage device 1, direct decimal signal pulses are released through the auxiliary terminal board 7.

After the contact member 5 has sequentially engaged all the stationary terminals 3 it will engage the additional contacts 18 and 19. The effect of the engagement of the contact 18 is similar to that obtained from the engagement of any one of the contacts 3, i.e. an impulse is fed from contact 18 into the translator arrangement 8 so that a control signal in coded form is delivered via the terminal board 10 as well as through the output terminal 15. When thereafter the contact 19 is engaged by the contact member 5, the relay coil Z is energized. Hereby, the normally closed relay contact $z_1$ is opened and the normally open contact $z_2$ is closed. Thus the relay coil A that had been held in energized condition, is de-energized so that its contacts $a_1$ and $a_2$ are opened again. The relay coil B remains, however, energized because now the contact $z_2$ is closed. Thus the motor M remains in operation. However, as soon as the contact member 5 leaves the contact 19 the relay coil Z is de-energized and by opening the contact $z_2$ the relay coil B is de-energized, the motor contact $b$ is opened and the motor M is stopped. The contact member 5 is now again in its starting position on the segment 16, while the closing of the contact $z_1$ restores the whole control circuit to its original condition ready for another start of operation.

The starting button switch S is not necessarily to be hand operated but may for instance in the case of a connection of the arrangement according to the invention with a calculating machine, be operated automatically from the calculating machine or together with the latter.

It has been stated above, that the number and arrangement of the various stationary contacts of the switches 4 and 12 may be chosen in accordance with circumstances and requirements. For instance, for avoiding too high a rotary speed of the contact arm 13 carrying out one revolution during the period in which one of the stationary contacts of the selector switch 4 is engaged, the switch 12 may be built with a plurality of groups of stationary contacts in consecutive arrangement around the circumference thereof so that, if for instance three consecutive groups of stationary contacts 17, 11, 21, are arranged in the switch 12, the contact arm 13 needs only to carry out one-third of a revolution while the contact member 5 is in engagement with one of the stationary contacts of the translator switch 4. Evidently, in such case analogous stationary contacts of each group of the stationary contacts of switch 12 are to be connected in parallel with each other so that the same effect is obtained no matter whether the arm 13 engages for instance the first contact 11 in the first, second or third group of contacts. Finally, it can be seen that the duration of each message impulse and the resulting individual code-digit signals depends entirely upon the speed of the motor M or on the speeds applied through the gear transmission G to the rotary members 5 and 13, respectively, of the switches 4 and 12 because the duration of the signals is determined by the time through which the movable contact members remain in engagement with the individual stationary contacts.

It will be understood that each of the elements described above, or two or more together, may also find a useful application in other types of arrangements for series-transmission of code-digit signals differing from the types described above.

While the invention has been illustrated and described as embodied in an arrangement for series transmission of a group of electrical code-digit signals representing a message in terms of a multi-order code, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An information output arrangement for delivering the output of an information handling system simultaneously in different forms including different forms of a chosen multi-order code, comprising, in combination, (*a*) means for supplying electric energy;

(*b*) information transfer means for making available multi-order digital information having a plurality of control pulse input means respectively associated with different order positions of said multi-order digital information, and a plurality of pulse output means respectively associated with different digital values, said transfer means releasing an output pulse representing a digital value upon application of a control pulse;

(*c*) electrical coding means connected with said output means for translating output pulses representing digital values released from said transfer means into output signals representing such digital values in terms of a multi-order code and having a plurality of output means for delivering said output signals as a group of code pulses in parallel;

(*d*) first stepwise operable selector switch means connected with said output means of said coding means and having an output terminal for delivering during each cycle of operation thereof said output signals as a coded sequence of pulses in terms of said multi-order code;

(*e*) second stepwise operable selector switch means connected between said means for supplying electric energy and said control pulse input means of said information transfer means for applying sequentially during each of its cycles of operation a control pulse to each of said control pulse input means; and (f) drive means for operating said first and second selector switch means in such a manner that said first selector switch means carries out at least one complete cycle of operation while said second selector switch means applies one of said control pulses to said information transfer means, whereby with consecutive steps of said second selector switch means output pulses representing digital values are released in the sequence of their respective order positions from said transfer means, translated by said coding means into output signals in terms of the multi-order code and these output signals are delivered simultaneously in parallel and in series.

2. An information output arrangement for delivering the output of an information handling system simultaneously in different forms including different forms of a chosen multi-order code, comprising, in combination;

(a') means for supplying electric energy;

(b') information transfer means of the matrix type for storing and for making available multi-order digital information and having a plurality of control pulse input means respectively associated with different order positions of said multi-order digital information, and a plurality of pulse output means respectively associated with different digital values, said transfer means releasing an output pulse representing a digital value upon application of a control pulse;

(c') electrical coding means connected with said output means for translating output pulses representing digital values released from said transfer means into output signals representing such digital values in terms of a multi-order code and having a plurality of output means for delivering said output signals as a group of code pulses in parallel;

(d') first stepwise operable rotary selector switch means connected with said output means of said coding means and having an output terminal for delivering during each cycle of operation thereof said output signals as a coded sequence of pulses in terms of said multi-order code;

(e') second stepwise operable rotary selector switch means connected between said means for supplying electric energy and said control pulse input means of said information transfer means for applying sequentially during each of its cycle of operation a control pulse to each of said control pulse input means; and (f') drive means for operating said first and second rotary selector switch means in such a manner that said first selector switch means carries out at least one complete cycle of operation while said second selector switch means applies one of said control pulses to said information transfer means, whereby with consecutive steps of said second selector switch means output pulses representing digital values are released in the sequence of their respective order positions from said transfer means, translated by said coding means into output signals in terms of the multi-order code and these output signals are delivered simultaneously in parallel and in series.

3. An information output arrangement for delivering the output of an information handling system simultaneously in different forms including different forms of a chosen multi-order code, comprising, in combination, (a'') means for supplying electric energy;

(b'') information transfer means for making available multi-order digital information and having a plurality of control pulse input means respectively associated with different order positions of said multi-order digital information, and a plurality of first pulse output means and a plurality of second pulse output means, both respectively associated with different digital values, said transfer means releasing an output pulse representing a digital value upon application of a control pulse, said plurality of second pulse output means delivering said digital information as output pulses respectively representing digital values in uncoded form;

(c'') electrical coding means connected with said first output means for translating output pulses representing digital values released from said transfer means into output signals representing such digital values in terms of a multi-order code and having a plurality of output means for delivering said output signals as a group of code pulses in parallel;

(d'') first stepwise operable selector switch means connected with said output means of said coding means and having an output terminal for delivering during each cycle of operation thereof said output signals as a coded sequence of pulses in terms of said multi-order code;

(e'') second stepwise operable selector switch means connected between said means for supplying electric energy and said control pulse input means of said information transfer means for applying sequentially during each of its cycles of operation a control pulse to each of said control pulse input means; and (f'') drive means for operating said first and second selector switch means in such a manner that said first selector switch means carries out at least one complete cycle of operation while said second selector switch means applies one of said control pulses to said information transfer means, whereby with consecutive steps of said second selector switch means output pulses representing digital values are released in the sequence of their respective order positions from said transfer means, translated by said coding means into output signals in terms of the multi-order code and these output signals are delivered simultaneously in parallel and in series.

4. An arrangement as claimed in claim 2, wherein said first rotary selector switch means comprises a plurality of first contacts arranged in circular array and connected with said plurality of output means, respectively, of said coding means, a signal output terminal and a rotatable selector contact member conductively connected with said signal output terminal and establishing conductive connection between the latter and said first contacts successively when said first selector switch means is operated, and wherein said second rotary selector switch means comprises a plurality of second contacts arranged in circular array and connected with said plurality of control pulse input means, respectively, of said information transfer means, and a rotatable selector contact member connected with one pole of said means for supplying electrical energy and establishing conductive connection between said pole and said second contacts successively when said second selector switch means is operated.

5. An arrangement as claimed in claim 4, wherein said coding means include translator means for converting command signal pulses into command output signals in terms of said multi-order code and for delivering such command output signals as code pulses at said output means of said coding means and through said first selector switch means at said signal output terminal thereof, and wherein said second selector switch means includes at least one control contact arranged within said array of said second contacts and connected with said translator means, said rotatable contact member establishing connection between said pole and said translator means for applying a command signal pulse thereto when during a cycle of operation said rotatable contact member engages said control contact.

6. An arrangement as claimed in claim 5, wherein said second selector switch means includes a first control contact and a second control contact arranged within said circular array in such a manner that when said second selector switch means is operated, said rotatable contact member engages, during each cycle of operation, first said first control contact, then successively said second contacts and thereafter said second control contact.

7. An arrangement as claimed in claim 6, wherein said drive means comprise motor means and electrically operable control means for starting and stopping said motor means, and wherein said second selector switch means includes a third control contact arranged to be engaged by said rotatable contact member after the latter has been in engagement with the other contacts in said array thereof and connected in circuit with said control means whereby said motor means is stopped by actuation of said control means at the end of each operational cycle of said second selector switch means.

8. An arrangement as claimed in claim 2, wherein said drive means include motor means and transmission means operatively connected between said motor means and said first and second selector switch means for causing said first selector switch means to carry out one complete cycle of operation while said second selector switch means applies one of said control pulses to said information transfer means.

9. An arrangement as claimed in claim 8, wherein said transmission means is a gear transmission converting a predetermined input speed into two different output speeds.

10. An arrangement as claimed in claim 7, wherein said drive means include motor means and transmission means operatively connected between said motor means and said first and second selector switch means for causing said first selector switch means to carry out one complete cycle of operation while said second selector switch means applies one of said control pulses to said information transfer means.

11. An arrangement as claimed in claim 10, wherein said transmission means is a gear transmission converting a predetermined input speed into two different output speeds.

References Cited in the file of this patent

UNITED STATES PATENTS

| | | |
|---|---|---|
| 2,808,984 | Marshall | Oct. 8, 1957 |
| 2,894,254 | Mork | July 7, 1959 |
| 2,907,021 | Woods | Sept. 29, 1959 |